United States Patent [19]
Sheridon

[11] 3,742,439
[45] June 26, 1973

[54] IMAGING SYSTEM
[75] Inventor: Nicholas K. Sheridon, Fairport, N.Y.
[73] Assignee: Xerox Corporation, Stamford, Conn.
[22] Filed: Jan. 12, 1972
[21] Appl. No.: 217,164

Related U.S. Application Data
[63] Continuation of Ser. No. 804,539, March 5, 1969, abandoned.

[52] U.S. Cl.............. 340/5 H, 73/67.5 H, 350/3.5
[51] Int. Cl. ........................................... G01n 29/04
[58] Field of Search ...................... 340/5 H, 5 MP; 343/17; 73/67.5 H

[56] References Cited
UNITED STATES PATENTS
3,434,339   3/1969   Stetson et al. .................. 340/5 H X
3,564,905   2/1971   Brenden et al. ................ 340/5 H X Primary Examiner—Richard A. Farley
Attorney—James J. Ralabate, David C. Petre and Gaetano D. Maccarone et al.

[57] ABSTRACT

An imaging member comprising a substrate, at least partially transparent to ultrasonic radiation, with a thin layer of liquid thereon, the layer preferably of a particular preferred thickness, is used for the detection of the interference pattern resulting from the interference of two phase correlated beams of ultrasonic energy, one beam typically being a reference beam and the other an object modulated beam. The free surface of the thin liquid layer is deformed by the interference pattern to form an acoustic hologram which may be used to reconstruct an optical image of the object and may be used in other advantageous ways as described herein. Electric field techniques to amplify the ultrasonically produced pattern of deformation of the free surface of the thin liquid layer; a diverging acoustic lens and a method of making a preferred elastomeric liquid layer are also described.

59 Claims, 8 Drawing Figures

IMAGING SYSTEM

BACKGROUND OF THE INVENTION

This application is a continuation application of prior copending patent Ser. No. 804,539 filed Mar. 5, 1969 and now abandoned.

This invention relates to an imaging system and more specifically to a novel ultrasonic holography imaging system.

High frequency sound like coherent light can be used to construct a hologram. A background on optical holography is found in the BACKGROUND section of my copending application Ser. No. 728,986, filed May 14, 1968 and now U.S. Pat. No. 3,580,657.

Preston and Kreuzer, Applied Physics Letters, 10, No. 5, 150 (Mar. 1, 1967) describes making ultrasonic holograms by scanning an ultrasonic receiver carefully along the interference pattern of two ultrasonic beams and recording the instantaneous ultrasonic intensity as a photographic film density. The original object can then be reconstructed by illuminating the photographic film with light. Mueller and Sheridon, Applied Physics Letters, 9 No. 9,328 (Nov. 1, 1966) describes making ultrasonic holograms by directing the reference and object modulated ultrasonic beams toward the surface of a liquid medium in which they are propagating. These beams, interfering at the liquid surface, give rise to a radiation pressure displacement of the liquid surface to form a stationary ripple pattern. Using Schlieren-like techniques the stationary ripple pattern was then recorded on photographic film. When the photographic film was illuminated with coherent light, a reconstructed image, visible to the human eye, of the original object was obtained. Young and Wolfe, Applied Physics Letters, 11 No. 9,294 (Nov. 1, 1967) discloses recording ultrasonic holograms using deformable films on solid substrates.

While advantageous, in all of these schemes, the quality of the image of the reconstructed object suffered because in addition to the deformation pattern produced by the object beam interfering with the reference beam, the liquid or softened plastic material surface was also distorted by extraneous signals such as surface waves created by building vibrations, by objects moving in the liquid and by displacement of the liquid surface due to acoustic streaming to cause over modulation of the deforming surface.

Thus, there is a continuing need for a better ultrasonic holography imaging system and especially one which strongly dampens noise.

SUMMARY OF THE INVENTION

It is, therefore, an object of this invention to provide an ultrasonic holography imaging system which overcomes the above noted deficiencies and satisfies the above noted wants.

It is a further object of this invention to provide an ultrasonic holography imaging system that makes it possible to reconstruct a higher quality optical image of the original, ultrasonically illuminated object, in real time.

It is a further object of this invention to provide an ultrasonic holography imaging member with preferred specific thickness layers of liquid thereon, the thickness of the liquid layer adjusted so that it will respond preferentially to an ultrasonic interference pattern having a wavelength characteristic with the primary interference between the object modulated and reference ultrasonic beams, thereby providing for the strong dampening out and rejection of noise wavelengths from other sources.

It is a still further object of this invention to provide an ultrasonic holography imaging system with an electric field amplitude enhancing technique.

It is a still further object of the invention to provide an ultrasonic holography imaging system to eliminate sources of noise and optical distortion normally encountered at a liquid surface type ultrasonic hologram, thus enabling real time readout to take place.

It is a still further object of this invention to provide an ultrasonic holography imaging system with an optical electric field means of amplifying the thin liquid surface relief pattern, thereby increasing the sensitivity of the system.

It is a still further object of this invention to provide an ultrasonic holography imaging system with a new diverging acoustic lens and a new preferred elastomeric liquid deformation layer.

The foregoing objects and others are accomplished in accordance with this invention by providing an imaging member comprising a substrate, at least partially transparent to ultrasonic radiation, with a thin layer of liquid thereon, the layer preferably of a particular preferred thickness, is used for the detection of the interference pattern resulting from the interference of two phase correlated beams of ultrasonic energy, one beam typically being a reference beam and the other an object modulated beam. The free surface of the thin liquid layer is deformed by the interference pattern to form an acoustic hologram which may be used to reconstruct an optical image of the object and may be used in other advantageous ways as described herein. Electric field techniques to amplify the ultrasonically produced pattern of deformation of the free surface of the thin liquid layer; a diverging acoustic lens and a method of making a preferred elastomeric liquid layer are also described.

The term "liquid" and the variant forms thereof used herein to define the layer of this invention which is ultrasonically deformed includes those substances ordinarily thought of as liquids up to and including the relatively viscous liquids of about $10^3$ poises, includes materials which are often regarded as soft solids and have viscosities in the range of about $10^3 - 10^7$ poises (said soft solid materials typically including thermoplastics such as those used in frost wrinkling described in Gunther et al. U.S. Pat. No. 3,196,011) and also includes a preferred elastomeric class of materials for use herein.

The term "elastomer" and the variant forms thereof used herein is defined as an amorphous material which exhibits a restoring force in response to a deformation; that is, an amorphous material which deforms under a force, and, because of volume and surface forces, tends to return to the form it had before the force was applied.

Optically but preferably, because of the amplified patterns produced, electric field techniques may be used to bring the thin liquid layer to a very unstable condition such that when the ultrasonic interference pattern impinges on the thin liquid layer the instability is triggered by the pattern which results in a significant amplification of the thin liquid layer free surface ultrasonic interference pattern produced relief pattern.

Optimally, the thickness of the thin liquid layer should be a given magnitude relative to the wave length of the interference pattern impinging on the thin layer which will always be greater than the wavelength of the ultrasonic reference and object modulated beams, the interference pattern wavelength approaching the wavelength of the reference and the object modulated ultrasonic beams as the incoming direction of each of the two beams approaches the condition of being in the plane of the imaging member. Preferred thicknesses of the liquid layer which give substantially improved results over prior art techniques where there is no control over the thickness of the thin liquid layer and thus which have no substantial dampening out of noise and improved enhancement of the special frequencies of interest as provided for by the invention hereof, have been found to prevail for a liquid layer varying in thickness between about 1/30 to about 2 times the wavelength of the ultrasonic interference pattern in the plane of the thin liquid layer. This high pass filter characteristic of the thin controlled liquid layers hereof rejects extraneous sources of noise such as seismic vibrations, acoustic streaming, and vibrations from any source that would normally cause surface waves and disrupt and detract from the liquid surface deformation pattern produced by the interference pattern. Coherent or partially coherent light may be reflected from the distorted liquid surface, the ultrasonically distorted surface acting like an ultrasonic hologram and reconstructed optical images will appear in space. These reconstructed optical images may be conveniently viewed by suitable optical techniques known to those skilled in the art.

BRIEF DESCRIPTION OF THE DRAWINGS

For a better understanding of the invention as well as other objects and further features thereof, reference is made to the following detailed disclosure of this invention taken in conjunction with the accompanying drawings wherein.

DESCRIPTION OF THE PREFERRED EMBODIMENTS

Figure 1:
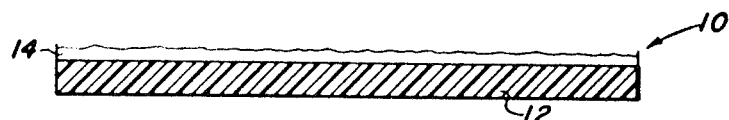
FIGS. 1 and 2 are partially schematic side views of two embodiments of the imaging member according to the invention.

Referring now to FIG. 1 there is shown imaging member 10 comprising substrate 12 which is at least partially transparent to the ultrasonic waves to be used in imaging and liquid layer 14.

For the ultrasonic waves found to be suitable for use herein which are typically between about 100,000 cycles/second to about 100 megacycles (mc); typical at least partially transparent substrates 12 for waves in this wavelength region include plastics. A distinct advantage has been found in the use of most plastics as substrates 12 in their attenuation properties. Their thickness and attenuation can be so adjusted so that they are sufficiently acoustically transparent yet multiple reflections within the substrate that could give rise to serious defects are effectively eliminated. The attenuation is exponential with distance. For a given attenuating material the thickness is so adjusted that the intensity of a multiply reflected beam emerging from the window is less than about 2 percent of the intensity of a directly transmitted beam. Sufficiently attenuating plastics can be found such that the round trip attenuation of a convenient thickness of the plastic will attenuate a multiply reflected beam to a value much less than that of the directly transmitted beam. Other materials such as glass and metals may also be used as substrate 12, but most plastics are preferred over glass and metals since plastics have higher acoustic attenuation. Plastic substrates are also preferred in that their acoustic impedance and acoustic velocity are more clearly similar to that of the propagating liquid and the preferred layers 14, thus reflecting smaller portion of the ultrasonic energy entering the substrate allowing for a greater angle between the reference beam and the object modulated beam and allowing more energy to enter layer 14. It has been found that at sufficiently large angles between the two beams, the maximum angle determined by the acoustic velocity ratio between the substrate 12 and the medium of thin liquid layer 14, critical angle reflection takes place such that no ultrasonic energy can enter the substrate.

While a high density polyethylene substrate 12 gives good results an even more preferred substrate comprises an acrylic plastic to which a thin layer of Teflon has been bonded on both sides to give a total layer 12 thickness of about one-half inch.

Layer 14 may preferably comprise water which has low ultrasonic attenuation, is compatible with most materials and is readily available; or oils such as silicone oils which desirably have low vapor pressures, are not easily contaminated, have low surface tensions and a range of available viscosities so that one can adjust the response time of the liquid layer for various surface excitation wavelengths. Dow Corning Silicone Oil No. 704 has been found very effective in this regard. However, any suitable electrically conductive or insulating liquid may be used.

The preferred class of elastomeric soft solid materials for use herein includes both natural, such as natural rubbers, and synthetic polymers which have rubber-like characteristics, i.e., are elastic and including materials such as styrene-butadiene, poly-butadiene, neoprene, butyl, polyisoprene, nitrile, and ethylene-propylene rubbers. Preferred elastomers for use herein include water based gelatin gels and dimethylpolysiloxane based silicone gels.

Preferably the liquid layer 14 contains a colorant such as a dye or a pigment to prevent multiple reflections of the optical readout beam within the volume of the liquid. Such reflections give rise to annoying interference patterns.

Figure 2:
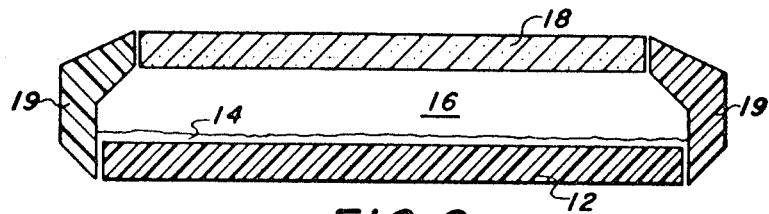

Referring now to FIG. 2, there is shown a member 10 with an air interspace 16 above which is an optically transparent window 18.

While window 18 is not necessary for the practice of the invention hereof, its presence is preferred because one of its main functions is to keep out dust, which especially in the electric field amplifying techniques hereof, wherein dust is attracted at an increased rate, is found to be a problem which may hinder image quality.

Figure 3:
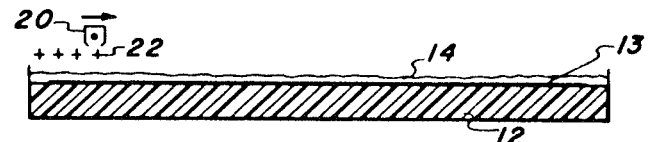
FIGS. 3-6 are other partially schematic illustrations of other embodiments of imaging members according to the invention with attendant apparatus to place an electric field adjacent or across the liquid layer 14 to thereby obtain amplification of the ultrasonically induced surface deformation.

Referring now to FIG. 3, there is shown an optional embodiment of an imaging member wherein the basic imaging member embodiment 10 is modified by including on the substrate 12 a separate electrically conductive layer 13 of at least partially ultrasonically transparent material such as a vacuum deposited layer of metal. This embodiment is conveniently used when corona charging electric field amplification of the ultrasonically induced surface deformation of layer 14 is desired. The member is used in connection with corona discharge device 20 illustratively traveling from left to right, depositing illustratively positively charged corona, intended to represent any suitable corona discharge device. In particular, devices of the general description and generally operated as disclosed in Vyverberg U.S. Pat. No. 2,836,725 and Walkup U.S. Pat. No. 2,777,957 have been found to be sources of corona useful in corona charging. The device should be placed in such a way that it will cause minimal interference with light entering from the top and used in reconstructing an optical image. Another preferred charging mode which causes a minimal interference with reconstruction light is the apparatus and method shown in FIG. 3 of Gunther et al. U.S. Pat. No. 3,196,011 and the written portions of the specification relating to FIG. 3. Corona charging layer 14 to create a surface potential thereon creates a surface instability which is found to amplify the ultrasonically produce surface relief of layer 14. An electrically insulating liquid 14 should be used in this corona charging technique of electric field amplification since the layer 14 should support the charge long enough for ultrasonic imaging to take place. Liquids with resistivities of about $10^{13}$ or $10^{14}$ ohm-cm or higher support charge for about 1 to 10 seconds or longer, respectively, and are thus preferred in this regard. It will be appreciated that conductive layer 13 or even a conductive substrate 12 is not necessary in the corona charging electric field amplification mode hereof since double sided corona charging may be used to charge insulating members where two corona charging devices one on each side of the imaging member are oppositely charged are traversed in register relative to the member. Also if substrate 12 is insulating and no layer 13 is used, substrate 12 may be placed in contact with a conductive member during charging.

Figure 4A:
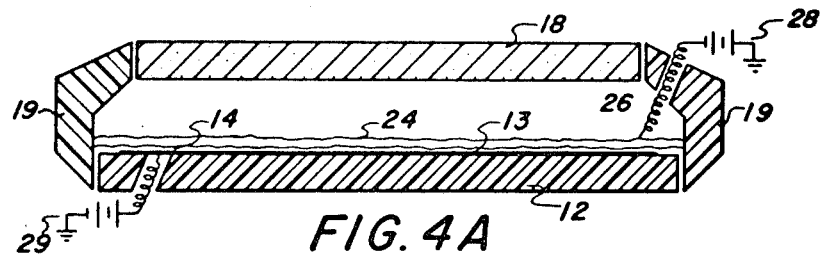

Referring now to FIG. 4A there is shown another embodiment of an imaging member hereof with an electric field means. A liquid electrode layer 24 resides on the top surface of layer 14 which is on electrode 13. Liquid 24 is electrically conductive, typically immiscible with the material of layer 14, and may be transparent or reflective to reconstruction light entering through window 18. Layer 24 may be a thin layer of mercury or a gallium-indium alloy or an aqueous salt solution which is in direct electrical contact through wire 26 with power source 28. Preferably liquid 24 is of a highly reflective metal such as mercury which increases the optical efficiency of the system by a factor of about 10 over layers 14 such as silicone oil or water with no reflecting layer 24. In this embodiment of FIG. 4A the combined thickness of layers 14 and 24 should be between about 1/30 to about 2 times the wavelength of the ultrasonic interference pattern in the deforming liquid layer.

Figure 4B:
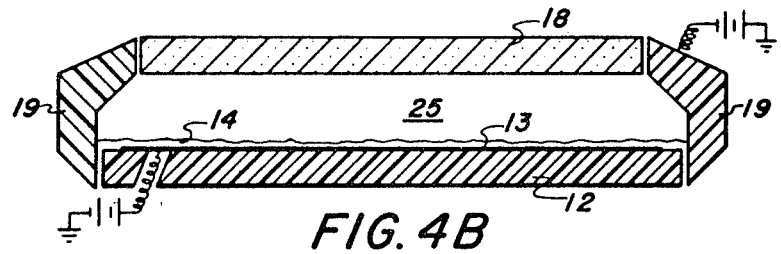

Referring now to FIG. 4B there is shown another imaging member embodiment where the entire space between optical window 18 and layer 14 is filled with a conductive liquid 25.

Window 18 is in intimate contact with the top surface of electrically conductive liquid 25 which in addition to being optically transparent to light entering through window 18 serves as an electrode on one side of the liquid layer 14 to create an electric field across the thin liquid layer 14 between electrodes 25 and 13. Conductive frame 19 biases liquid 25.

In the electrical field amplification means hereof as shown in FIGS. 3-4 where layer 14 is sandwiched between electrodes, potential differences across liquid layer 14 in the range of from between about 1 volts/micron and about 10 volts/micron have been found to be preferred with a minimum threshold field being about 1/10 volt/micron and a maximum practical field being about 100 volts/micron. Higher fields than 100 volts/micron may be used but arcing and other disruptive forces become a factor.

Figure 5:
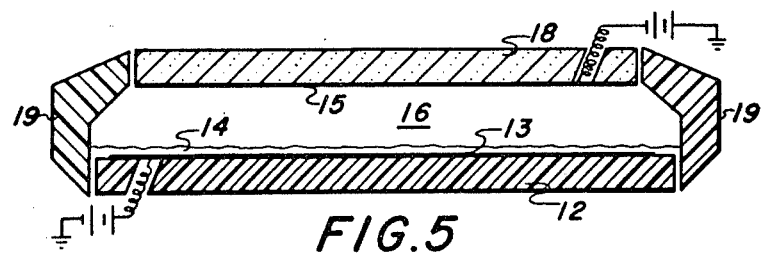

Referring now to FIG. 5, there is shown another electric field amplification means wherein a strong bias is applied to electrode 13, which supports liquid layer 14. It has been observed that when a relatively high bias in the order of between about 100 and about 20,000 volts is applied to electrode 13, the thin overlayer 14 of deforming liquid will become unstable due to polarization forces created within the volume. Then the surface of the liquid will want to deform in the pattern of a distribution of small ultrasonic forces. Electrode 15 is optional in this embodiment but may be opposite to (and typically equal to) the bias on electrode 13 in order to enhance the electric field.

Figure 6:
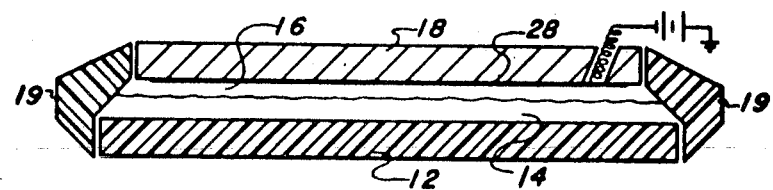

FIG. 6 is a variation of FIG. 5 wherein the biased transparent electrode 28 is maintained near but spaced apart from the liquid layer 14. With this configuration biases of about 50 to about 10,000 volts are preferred to make the liquid surface unstable for amplification, with the gap between the electrode and the liquid layer preferably being greater than the vertical rise of the deformations on layer 14 and less than about 1 inch. Electrode 28 may be tin oxide coated glass available under the trademark NESA from Pittsburg Plate Glass Company on the under side of transparent window 18.

Figure 7:
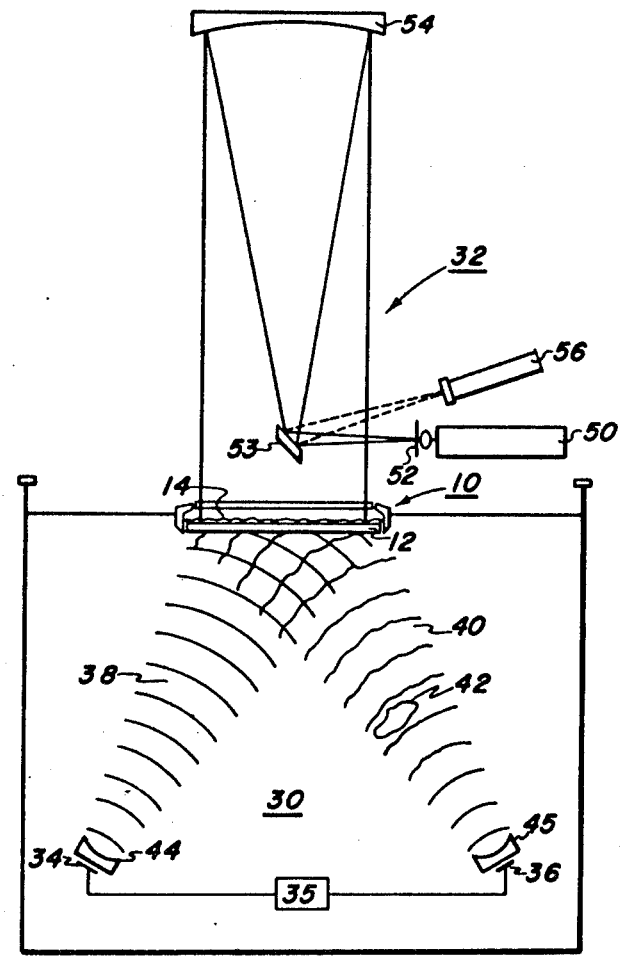
FIG. 7 illustrates an example of a preferred mode of ultrasonically forming a surface deformation hologram on an imaging member according to the invention and then optically reconstructing an optical image of the original object.

Referring no to FIG. 7 there is shown the impinging ultrasonic beams 38 and 40, traveling through propagating medium 30 typically water. Also shown are impinging member 10 hereof and an optical readout system 32. Transducers 34 and 36, connected to the same RF generator 35 emit phase correlated beams of ultrasonic energy 38 and 40, respectively, beam 38 being the reference beam and beam 40 being the beam modulated by underwater object 42. Transducers 34 and 36 typically use piezo-electric crystals such as quartz of piezo ceramic available from Valpey Corp. to produce narrow pencils of ultrasonic energy. These narrow beams of ultrasonic energy may be diverged by acoustic lenses 44 and 45 which are typically composed of carbon tetrachloride filled chambers having spherical exit windows typically made of Mylar polyester from DuPont or other resistant plastic material. Alternatively the ultrasonic transducers may be composed of spherically ground quartz or other piezo-electric materials that themselves emit spherical beams of ultrasound.

Figure 8:
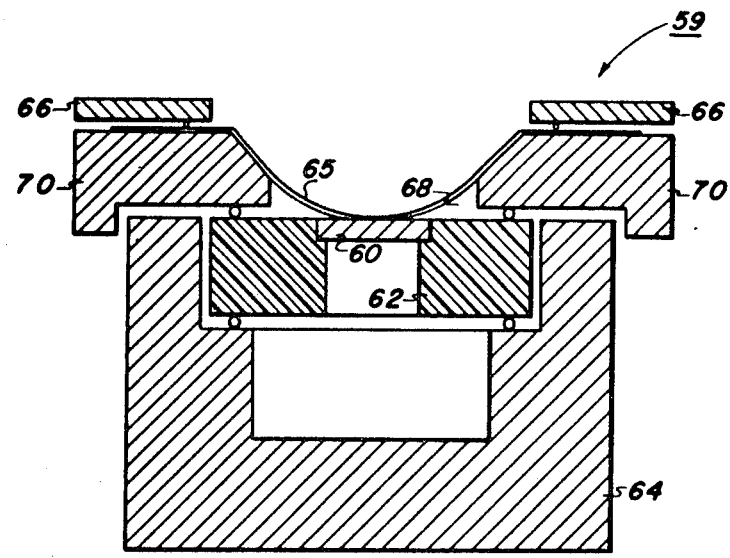
FIG. 8 shows a cross-section of a preferred diverging acoustic lens-transducer combination.

Alternatively the combination diverging acoustic lens-transducer 59 shown in FIG. 8 may be used. 60 is the crystal seated in a crystal mount 62 preferably of Teflon tetrafluoroethylene fluorocarbon from DuPont. 64 is the frame for example of brass with pressure flanges 66 holding a flexible film window 65 at least a partially ultrasonically transparent material compatible with the propagating medium within which article 59 is typically located and the liquid within space 68 defined by the frame portions 70 on each side, the crystal on the bottom and the flexible film window on the top. The liquid within space 68 should have an acoustic velocity less than the propagating medium and be compatible with the flexible film window. With water as the propagating medium, a Mylar polyethylene terephthalate polyester film about 4 mils thick as window 65 and carbon tetrachloride ($CCl_4$) as the liquid for space 68 were found to give good results. Preferred article 59 provides the desirable result that the transducer itself is the back surface of the lens. It will be appreciated that the flexible window 65 may be convex as well as concave as shown.

Whatever transducer arrangement is chose, these transducers typically operate from a common radio frequency generator 35 which has a long term frequency stability to ensure mutual coherency of beams 38 and 40 with one another so that they can interact to form a stationary ultrasonic interference pattern. Typically either beam 38 or 40 is transmitted through, reflected or by in any other suitable way modulated by an object 42 and this beam then passes to imaging member 10 where it interferes and overlaps with reference beam 38 in liquid layer 14 to produce a region in which the dynamic ultrasonic pressure experiences maxima and minima to thereby create a momentum associated with reflection of the ultrasonic beams on a liquid surface 14 which tends to cause a displacement of the liquid 14 surface. This displacement for practical purposes is substantially immediately (for example in the order of about a millisecond) caused by the interference between the two beams giving rise to a time independent real pattern which may be amplified by the electric field techniques already described and then reconstructed by coherent or partially coherent light, for example from laser light source 50. The light is filtered by pinhole 52, and from mirror 53 passes to parabolic mirror 54 or a lens which may serve as an equivalent where it is commonly but not necessarily collimated whereupon the rays then pass to ultrasonically deformed liquid surface 14 whereupon the rays are reflected from this surface back to mirror 54, being phase modulated, the phase modulated rays normally made converging conveniently by the same mirror 54, this reflected beam containing at least two angularly separated images of the acoustically illuminated object. One of these may be selected for examination by the telescope 56, the other may impinge on, for example, photographic film for recording.

The following Examples further specifically define the present ultrasonic holography imaging system. The parts and percentages are by weight unless otherwise indicated. The Examples below are intended to illustrate various preferred embodiments of the ultrasonic holography imaging system of this invention.

EXAMPLE I

Referring now to FIG. 7, a Teflon coated acrylic plastic substrate 12 about one-half inch thick is overcoated with an approximately 0.1 mm thick layer of dyed water. The layer is exposed to about 7 mc ultrasonic energy as follows:

A first beam 38 is directed towards substrate 12 from the underside of layer 12 at an angle of about 12° to imaging member 10 normal. The object modulates the beam from transducer 36 and lens 45, sound from this source passing through or by the center of the object and intersects the layer 14 making an angle of about 12 degrees to the member 10 normal. These two beams overlap in the thin layer 14 region giving rise to interference surfaces that are about 0.5 mm apart.

Imaging member 10 is exposed continuously to these ultrasonic beams to give a constant relief pattern to the surface of layer 14.

The hologram surface of layer 14 is reconstructed by directing light from a continuous wave laser of about 10 milliwatt optical power so that the laser light hits the top surface of layer 14 at normal incidence. A 3-D image of the acoustically illuminated object is then seen by a human observer using the telescope.

EXAMPLE II

Example I is followed except that liquid layer 14 is a dyed elastomer dimethylpolysiloxane silicone gel made by combining about 1 part of Dow Corning No. 182, silicone resin potting compound and anywhere from about 0 to about 30 parts of oil, Dow Corning No. 200 dimethylpolysiloxane silicone and heating between about 50°C. and about 150°C. for between about 15 minutes to about 24 hours.

"Contigous" as used herein is defined as in Webster's New Collegiate Dictionary, second edition, 1960; "In actual contact; touching; also, near, though not in contact; adjoining."

Although specific components and proportions have been stated in the above description of preferred embodiments of the ultrasonic holographic imaging system hereof, other suitable materials as listed herein may be used with similar results. In addition other materials which exist presently or may be discovered may be used or added to the mixture and variations may be made in the various processing steps to synergize, enhance and otherwise modify its properties. For example, separate electrode layers 13 and 28 are unnecessary if layers 12 and 18, respectively, are themselves electrically conductive. Also, it will be appreciated that since sound waves pass through many substances, one of the promising applications hereof is in X-ray type work.

It will be understood that various other changes in the details, materials, steps and arrangements of parts which have been herein described and illustrated in order to explain the nature of the invention will occur to and may be made by those skilled in the art upon a reading of this disclosure, such changes are intended to be included within the principle and scope of this invention.

What is claimed is:

1. An ultrasonic holography imaging method comprising the steps of
   a. providing an imaging member comprising a substrate at least partially transparent to ultrasonic radiation with a deformable substantially smooth surface solid elastomer layer thereon;

b. directing an object modulated coherent ultrasonic beam at said member; and c. directing a coherent reference beam of ultrasonic radiation phase correlated with the coherent radiation of said object modulated ultrasonic beam at said member wherein both the object modulated beam and reference beam are directed to said deformable solid elastomer layer through said substrate to create a stationary ultrasonic interference pattern in said deformable solid elastomer layer to thereby create an ultrasonic hologram in the form of surface ripples on said deformable solid elastomer layer.

2. An imaging method according to claim 1 wherein, before imaging, the thickness of said deformable solid elastomer layer is between about 1/30 to about 2 times the wavelength of the ultrasonic interference pattern formed in the plane of said layer by steps (b) and (c) of claim 1.

3. An imaging method according to claim 2 wherein said elastomer comprises a material selected from the group consisting of water based gels and dimethylpolysiloxane based silicone gels.

4. An imaging method according to claim 2 wherein steps (b) and (c) of claim 1 are repeated at least once after allowing the elastomer to snap back to its original substantially smooth surface condition after the previous ultrasonic imaging.

5. An imaging method according to claim 1 wherein said substrate comprises a plastic layer with at least one outer surface layer protecting said plastic layer from any degrading effect from either the propagating medium for said ultrasonic beams or the deformable solid elastomer layer.

6. An imaging method according to claim 1 including directing a reconstructing light to said deformable solid elastomer layer upon which has been formed a hologram in the form of surface ripples wherein said deformable solid elastomer layer contains a colorant to prevent multiple reflections of the reconstructing light within the volume of said deformable solid elastomer layer.

7. An ultrasonic holography imaging method comprising the steps of:

a. providing an imaging member comprising a substrate at least partially transparent to ultrasonic radiation with a deformable substantially smooth surface solid elastomer layer thereon;

b. directing an object modulated coherent ultrasonic beam at said member; and c. directing a coherent reference beam of ultrasonic radiation phase correlated with the coherent radiation of said object modulated ultrasonic beam at said member to create a stationary ultrasonic interference pattern in said solid elastomer layer to thereby create an ultrasonic hologram in the form of surface ripples on said solid elastomer layer.

8. An imaging method according to claim 7 wherein both said object modulated and said reference beams are propagated through water to said imaging member, both means impinging upon the imaging member from the substrate side.

9. An imaging method according to claim 7 wherein said substrate substantially dampens multiple acoustic reflections within the substrate.

10. An imaging method according to claim 7 including directing a reconstructing light to said solid elastomer layer upon which has been formed a hologram in the form of surface ripples wherein said solid elastomer layer contains a colorant to prevent multiple reflections of the reconstructing light within the volume of said solid elastomer layer.

11. An imaging method according to claim 7 wherein said substrate comprises a plastic layer with at least one outer surface layer protecting said plastic layer from any degrading effect from either the propagating medium for said ultrasonic beams or the solid elastomer layer.

12. An imaging method according to claim 9 wherein said substrate comprises a plastic.

13. An acoustic holographic imaging apparatus comprising:

a. a substrate at least partially transparent to acoustic radiation, and a deformable substantially smooth surface solid elastomer layer on said substrate for detecting the interference pattern resulting from the impingement of the two phase correlated beams of acoustic energy, recited below; and b. means for directing at least two phase correlated beams of acoustic energy at said deformable solid elastomer layer by directing said beams through said substrate, one beam being a reference beam and the other an object modulated beam, the thickness of said deformable layer being a predetermined magnitude relative to the wavelength of the interference pattern impinging on the deformable layer so as to substantially dampen extraneous sources of acoustic noise.

14. Apparatus as set forth in claim 13 wherein said substrate is at least partially transparent to said two phase correlated beams but substantially dampens multiple acoustic reflections within the substrate.

15. Apparatus as set forth in claim 13 further including optical readout means comprising a reconstructing light source directed to said deformable solid elastomer layer upon which has been formed a hologram in the form of surface ripples in said deformable solid elastomer layer due to a stationary acoustic interference pattern caused by said reference and object modulated beams, and detection means for detecting the phase modulated beams from said deformable solid elastomer layer for optical readout of the hologram formed thereon.

16. Apparatus as set forth in claim 15 wherein said deformable solid elastomer layer contains a colorant to prevent multiple reflections of the optical readout beam within the volume of said deformable solid elastomer layer.

17. Apparatus as set forth in claim 15 wherein said solid elastomer comprises a material selected from the group consisting of water based gels and dimethylpolysiloxane based silicone gels.

18. Apparatus as set forth in claim 14 wherein said substrate comprises a plastic.

19. Apparatus as set forth in claim 18 wherein said plastic comprises a material selected from the group consisting of polyethylene and acrylics.

20. Apparatus as set forth in claim 19 wherein said plastic layer has at least one outer surface of tetrafluoroethylene fluorocarbon.

21. Apparatus as set forth in claim 14 wherein the intensity of any multiply reflected beam emerging from the substrate to the deformable solid elastomer layer is less than about 2 percent of the intensity of a directly transmitted beam.

22. An ultrasonic holography imaging method comprising the steps of:
 a. providing an imaging member comprising a substrate at least partially transparent to ultrasonic radiation with a deformable liquid layer thereon;
 b. directing an object modulated coherent ultrasonic beam at said member;
 c. directing a coherent reference beam of ultrasonic radiation phase correlated with the coherent radiation of said object modulated ultrasonic beam at said member to create a stationary ultrasonic interference pattern in said deformable liquid layer; and
 d. applying an electric field to said deformable liquid layer so that said electric field is present at least during part of steps (b) and (c) to thereby create an amplified ultrasonic hologram in the form of surface ripples on said deformable liquid layer.

23. An imaging method according to claim 22 wherein said field is applied by electrostatically charging the free surface of an electrically insulating deformable liquid layer.

24. An imaging method according to claim 23 wherein the electric field established across the deformable liquid layer is in the range of from between about 1 volt/micron to about 10 volts/micron.

25. An imaging method according to claim 22 wherein an electrode is positioned contiguous the deformable liquid layer, the electrode at a bias between about 100 and 20,000 volts.

26. An imaging method according to claim 25 wherein the electrode is not spaced from the deformable liquid layer by a distance of more than about 1 inch.

27. An imaging method according to claim 25 is a thin overlayer of electrically conductive liquid overlying said deformable liquid layer.

28. An imaging method according to claim 22 wherein said deformable liquid layer is an elastomer.

29. An imaging method according to claim 28 wherein, before imaging, said elastomer layer has a substantially smooth surface.

30. An imaging method according to claim 28 wherein said elastomer comprises a material selected from the group consisting of water based gels and dimethylpolysiloxane based silicone gels.

31. An imaging method according to claim 28 wherein steps (b) and (c) of claim 22 are repeated at least once after allowing the elastomer to snap back to its original substantially smooth surface condition after a previous ultrasonic imaging.

32. An imaging method according to claim 22 wherein said substrate substantially dampens multiple acoustic reflections within the substrate.

33. An imaging method according to claim 22 wherein said substrate comprises a plastic layer with at least one outer surface layer protecting said plastic layer from any degrading effect from either the propagating medium for said ultrasonic beams or the deformable liquid layer.

34. An imaging method according to claim 22 including directing a reconstructing light to said deformable liquid layer upon which had been formed a hologram in the form of surface ripples wherein said deformable liquid layer contains a colorant to prevent multiple reflections of the reconstructing light within the volume of said deformable liquid layer.

35. An imaging method according to claim 22 wherein said reconstructing light is directed through an at least partially transparent window before it reaches said deformable liquid layer, the window to protect said deformable liquid layer from external foreign material.

36. An imaging method according to claim 24 wherein said deformable liquid layer has a bulk electrical resistivity greater than about $10^{13}$ ohm-cm.

37. An imaging method according to claim 22 wherein at least a portion of said electric field is applied between an electrically conductive layer on the top surface of said deformable liquid layer and another source of potential or ground on the opposite side of said deformable liquid layer from said electrically conductive layer.

38. An imaging method according to claim 37 wherein said electrically conductive layer is immiscible with the material of the deformable liquid layer and capable of deforming in accordance with and corresponding to the deformations in said deformable liquid layer and wherein the combined thickness of said electrically conductive layer and said deformable liquid layer is between about 1/30 to about 2 times the wavelength of the ultrasonic interference pattern to be produced in the deformable liquid layer.

39. An imaging method according to claim 38 wherein said electrically conductive layer comprises a reflective metal.

40. An imaging method according to claim 38 wherein said electrically conductive layer is a liquid.

41. An imaging method according to claim 35 wherein the space between said window and the top surface of said deformable layer is filled with an electrically conductive liquid.

42. An imaging method according to claim 41 wherein the electrical field is applied between said electrically conductive liquid and a potential source or ground on the opposite side of said deformable liquid layer from said electrically conductive layer.

43. An imaging method according to claim 22 wherein the electric field established across the deformable liquid layer is in the range of from between about 1/10 volt/micron to about 100 volts/micron.

44. An imaging method according to claim 22 wherein said deformable liquid layer rests on an electrically conductive layer biased to a potential within the range of between about 100 volts and about 20,000 volts.

45. An imaging method according to claim 32 wherein said substrate comprises a plastic.

46. An acoustic holographic imaging apparatus comprising:
 a. a substrate at least partially transparent to acoustic radiation, and a deformable layer on said substrate for detecting the interference pattern resulting from the impingement of the two phase correlated beams of acoustic energy recited below;
 b. means for directing at least two phase correlated beams of acoustic energy at said deformable layer, one beam being a reference beam and the other an object modulated beam, the thickness of said deformable layer being a predetermined magnitude relative to the wavelength of the interference pattern impinging on the deformable layer so as to substantially dampen extraneous sources of acoustic noise; and c. means for applying an electric field to said deformable layer to amplify the acoustic hologram formed as surface ripples on said deformable layer.

47. Apparatus as set forth in claim 46 wherein said electric field applying means comprises a corona discharge apparatus.

48. Apparatus as set forth in claim 46 wherein said electric field applying means comprises an electrically conductive liquid layer on the top surface of said detecting layer.

49. Apparatus as set forth in claim 48 further including an electrically conductive layer at least partially transparent to acoustic radiation and positioned between said deformable layer and said substrate.

50. Apparatus as set forth in claim 48 wherein said substrate is electrically conductive.

51. Apparatus as set forth in claim 48 further including a potential source coupled to said conductive liquid layer for applying said electric field to said deformable layer.

52. Apparatus as set forth in claim 51 further including a frame supporting said substrate with an optically transparent window to provide enclosed chamber including said deformable layer and said conductive layer.

53. Apparatus as set forth in claim 52 wherein said frame is insulating and said potential source is external to and is applied through said frame to bias said conductive layer.

54. Apparatus as set forth in claim 52 wherein said frame is conductive and said potential source is external to and is coupled to said frame to bias the conductive layer on said deformable layer.

55. Apparatus as set forth in claim 54 wherein said conductive layer on said deformable layer occupies the entire space of the chamber formed by the frame and optically transparent window.

56. Apparatus as set forth in claim 52 wherein said conductive layer over said deformable layer occupies the space formed by said frame and said optically transparent window, and further including an electrically conducting electrode on the inner surface of said optically transparent window wherein said potential source is coupled to said conductive layer to provide said electric field.

57. Apparatus according to claim 46 wherein the intensity of any multiply reflected beam emerging from the substrate to the deformable layer is less than about 2 percent of the intensity of a directly transmitted beam.

58. An acoustic holographic imaging apparatus comprising:

a substrate at least partially transparent to acoustic radiation, and a deformable layer on said substrate for detecting the interference pattern resulting from the impingement of the two phase correlated beams of acoustic energy recited below;

means for directing at least two phase correlated beams of acoustic energy at said deformable layer, one beam being a reference beam and the other an object modulated beam, the thickness of said deformable layer being a predetermined magnitude relative to the wavelength of the interference pattern impinging on the deformable layer so as to substantially dampen extraneous sources of acoustic noise;

optical readout means comprising a reconstructing light source directed to said deformable layer upon which has been formed a hologram in the form of surface ripples in said deformable layer due to a stationary acoustic interference pattern caused by said reference and object modulated beams;

detection means for detecting the phase modulated beams from said deformable layer surface for optical readout of the hologram formed thereon; and means for applying an electric field to said deformable layer to create an amplified acoustic hologram in the form of said surface ripples on said deformable layer.

59. Apparatus according to claim 58 wherein the intensity of any multiply reflected beam emerging from the substrate to the deformable layer is less than about 2 percent of the intensity of a directly transmitted beam.

* * * * *

UNITED STATES PATENT OFFICE
CERTIFICATE OF CORRECTION

Patent No. 3,742,439           Dated June 26, 1973

Inventor(s) Nicholas K. Sheridon

It is certified that error appears in the above-identified patent and that said Letters Patent are hereby corrected as shown below:

Column 2, lines 14-15, "optical" should read ---optional---.

Column 2, line 59, "optically" should read ---optionally---.

Column 6, line 49, "no" should read ---now---.

Column 6, lines 51-52, "impinging" should read ---imaging---.

Column 6, line 58, "of" should read ---or---.

Column 7, line 25, "chose" should read ---chosen---.

Claim 8, line 4, "means" should read ---beams---.

Signed and sealed this 20th day of August 1974.

(SEAL)
Attest:

McCOY M. GIBSON, JR.
Attesting Officer

C. MARSHALL DANN
Commissioner of Patents